United States Patent
Gramza

(10) Patent No.: US 9,468,193 B2
(45) Date of Patent: Oct. 18, 2016

(54) LIVESTOCK FEED RETENTION INSERT AND METHOD OF USE

(71) Applicant: Raymond A. Gramza, Victor, MT (US)

(72) Inventor: Raymond A. Gramza, Victor, MT (US)

( * ) Notice: Subject to any disclaimer, the term of this patent is extended or adjusted under 35 U.S.C. 154(b) by 0 days.

(21) Appl. No.: 14/797,144

(22) Filed: Jul. 12, 2015

(65) Prior Publication Data

US 2016/0014997 A1   Jan. 21, 2016

Related U.S. Application Data

(60) Provisional application No. 62/025,889, filed on Jul. 17, 2014.

(51) Int. Cl.
*A01K 5/00* (2006.01)
*A01K 5/01* (2006.01)

(52) U.S. Cl.
CPC .............. *A01K 5/00* (2013.01); *A01K 5/0135* (2013.01); *A01K 5/0114* (2013.01)

(58) Field of Classification Search
CPC ........ A01K 5/01; A01K 1/10; A01K 5/0107; A01K 5/0135; A01K 5/0114; A01D 87/127
USPC ........ 119/60, 58, 51.03, 51.12, 61.31, 61.54, 119/61.2; D30/121; 414/24.5
See application file for complete search history.

(56) References Cited

U.S. PATENT DOCUMENTS

| | | | | |
|---|---|---|---|---|
| 3,777,713 A | * | 12/1973 | Deats | A01K 1/10 119/60 |
| 3,851,624 A | | 12/1974 | Peak | |
| 3,906,903 A | | 9/1975 | Vandewater | |
| RE29,291 E | * | 7/1977 | Peak | A01K 1/10 119/60 |
| 4,330,231 A | * | 5/1982 | Brewer | A01K 5/0107 119/60 |
| 5,311,840 A | | 5/1994 | Rumbaugh | |
| 5,337,699 A | * | 8/1994 | Dyson | A01K 5/01 119/60 |
| 5,386,800 A | | 2/1995 | Pirok | |
| 5,582,131 A | * | 12/1996 | Curtis | A01K 5/02 119/51.11 |

(Continued)

OTHER PUBLICATIONS

Titan West Inc., Bextra West advertising, Bextra West Round Feeder and Bextra West Basket.

(Continued)

*Primary Examiner* — Yvonne Abbott-Lewis
(74) *Attorney, Agent, or Firm* — Mitchell J. W. Vap; John F. Haffey

(57) ABSTRACT

The described livestock feed retention insert provides a low cost alternative to significantly decrease hay waste during the feeding of live stock. The design of the described livestock feed retention insert allows it to maintain its livestock feed saving properties by fitting snugly over a selected bale of livestock feed, while accommodating conventional livestock feeders of varying diameters. The bottom member of the described livestock feed retention insert is generally the same circumference or diameter as the selected bale of livestock feed. The vertically extending bars are horizontally spaced so that live stock cannot stick their head between the vertically extending bars, which effectively decreases the area livestock are able to pull feed from the insert/conventional feeder combination. At the approximate midpoint of each of the vertically extending bars, a horizontal shelf is formed by bends in the vertical bars, which allows the insert to rest on the top member of the conventional feeder. The upper portion of the insert provides an upper extension to a conventional feeder, which prevents livestock from pulling hay from over the top of the feeder.

9 Claims, 3 Drawing Sheets

(56) References Cited

U.S. PATENT DOCUMENTS

| | | | | |
|---|---|---|---|---|
| D398,084 S * | 9/1998 | Hartl | ............................ | D30/121 |
| 5,868,098 A * | 2/1999 | Adams | ...................... | A01K 1/10 119/60 |
| 5,887,544 A * | 3/1999 | Popelier | ................... | A01K 5/01 119/61.54 |
| 6,045,314 A * | 4/2000 | Greene | ................ | A01D 87/127 119/60 |
| 6,209,488 B1 * | 4/2001 | Wright | ................. | A01K 5/0107 119/60 |
| 6,363,885 B1 * | 4/2002 | Akins | ................... | A01K 5/0107 119/51.01 |
| 6,550,422 B2 | 4/2003 | Plymell | | |
| 6,789,505 B1 | 9/2004 | Lienemann | | |
| 6,951,189 B1 * | 10/2005 | Lienemann | ............. | A01K 5/01 119/58 |
| 7,717,064 B1 * | 5/2010 | O'Neill | .................... | A01K 5/01 119/58 |
| 7,753,000 B1 * | 7/2010 | Turner | .................... | A01K 5/01 119/57 |
| 7,856,943 B2 * | 12/2010 | Lienemann | .............. | A01K 5/01 119/60 |
| 8,082,882 B1 * | 12/2011 | Tharp | ...................... | A01K 5/01 119/60 |
| 8,286,587 B2 * | 10/2012 | Sladkowski | ............. | A01K 5/01 119/51.11 |
| 8,651,055 B2 * | 2/2014 | Dreger | ................. | A01K 5/0135 119/61.5 |
| 8,887,665 B2 * | 11/2014 | Rocker | ................ | A01K 5/0128 119/61.2 |
| 8,997,693 B2 * | 4/2015 | Lienemann | .............. | A01K 5/01 119/60 |
| 2011/0120380 A1 | 5/2011 | Sladkowski et al. | | |

OTHER PUBLICATIONS

Zeitlow Distributing Company, Hay Cone Saver advertising.
Hay Basket, Inc, Hay Basket advertising.
Long Horn Horse & Pet Supply, feeder advertising.
Buddy Incorporated, Bale Buddy advertising.
Rural king.com, Tarter Equine Hay Basket advertising.

* cited by examiner

LIVESTOCK FEED RETENTION INSERT AND METHOD OF USE

CROSS REFERENCE TO RELATED APPLICATIONS

This application claims the benefit of Provisional Application No. 62/025,889 filed Jul. 17, 2014.

BACKGROUND OF THE INVENTION

1. Field of the Invention

Herein described is a "Livestock Feed Retention Insert," ("Insert") which prevents hay waste by decreasing the area of hay accessibility of feeding livestock by placing the insert over and around a bale of livestock feed material, within a standard a conventional livestock feeder. The preferred embodiment of the Insert also provides a removable upward extension to a conventional round bale feeder to prevent hay waste from over the top of the conventional feeder. The Insert is able to be moved and installed by one person. Furthermore, the Insert can accommodate round bale feeders of different diameters.

2. Description of the Related Art (Problem/Solution by Others in Prior Art)

Conventional round bale feeders, such as the one pictured in Photo 1 are standard in the livestock industry for multiple reasons. Such feeders allow feeding livestock to access hay, while preventing the livestock from completely entering the feeder and trampling all of the available hay. Conventional feeders can be tipped up on their side and rolled by one person to where a standard round bale has been deposited. Photo 4. The conventional feeder can then be tipped over and placed to encircle the already deposited round bale for livestock feeding. Therefore, special equipment, such as a front end loader is not required to lift and deposit a standard round bale into a conventional feeder.

Conventional round bale feeders are prevalent in the industry due to their maneuverability. Conventional round bale feeders provide a relatively low cost, maintenance free method of providing hay to feeding livestock. Nonetheless, the use of conventional round bale feeders typically produces excessive wasted hay from livestock pulling hay from the interior of the feeder and trampling it outside the feeder. Furthermore, as depicted in Photo 1, a typical round bale extends over the top of most conventional round bale feeders, which allows feeding livestock to pull hay over the top of most conventional feeders. The large spacing between the vertical bars of most conventional feeders allows much hay to be pulled from the interior of the conventional feeder to be dropped to the ground by the feeding livestock. Over the course of a year, much hay is wasted, causing an increase in hay costs to maintain the livestock.

Various attempts have been made in the industry to reduce hay waste. However, there continues to be a need for the herein described "Livestock Feed Retention Insert."

U.S. Pat. No. 7,856,943 ("943") discloses a livestock feeder with a lower, intermediate, and upper portion. The 943 patent teaches a livestock feeder where the intermediate portion of the feeder retains the same potentially hay wasting characteristics as conventional feeders because the intermediate upwardly extending bars are horizontally spaced to allow a feeding animal to insert its head all the way into the feeder. Such a design will still allow large clumps of hay to be pulled from the interior of the feeder. The 943 patent also teaches an upper portion, generally the shape of an inverted, truncated cone to accept feed material and direct it downward to the interior of the feeder. As such, the invention of the 943 patent contemplates loading of the feed material into the upper portion of the feeder, which would require a front end loader in the case of loading a standard round bale into the feeder. It is disclosed that the vertical height of the upper portion is such that access to feeding over the top of the feeder is denied to animals; however, the upper portion of the feeder is permanently connected to the intermediate and bottom portions of the feeder. Thus, purchase of an entirely new feeder would be required to obtain a feeder that prevents feeding from a round bale over the top of already prevalent conventional feeders.

U.S. Pat. No. 6,789,505 ("505") discloses a removable basket insert to be used with conventional hay feeders. The 505 insert is designed to specifically be inserted into a conventional feeder, and then have a conventional round bale loaded into the insert to prevent the round bale from sitting on the ground. Hay is to be placed within the insert for the animals to feed upon. Use of the 505 invention would require a front end loader to place a standard round bale into the "basket" for feeding.

Other "basket" feeders designed to prevent hay waste from conventional feeders also fail to address the problems solved by the present invention and its various embodiments. Various basket feeders similar to the hay insert disclosed in the 505 patent still require the feed material to be loaded into the "basket," which in most cases would require special equipment to do so.

3. Objects of the Present Invention

Due to the problems discussed above, there is a need for an improved livestock feed retention insert in the industry. The objectives of the present invention are to: (1) provide a removable insert to be used with already prevalent conventional livestock feeders, including feeders of different shapes and diameters; (2) that decreases the upper and lower feed access area to decrease the amount of feed being pulled from the feeder; (3) provides an upper extension to a conventional feeder to prevent feed from being pulled over the top of the feeder, yet still allow feeding from the upper portion of the feeder; (4) which is placed over a pre-positioned bale of feed material, rather than requiring the feed material to be loaded into the insert; and (5) is easy to move and install by one person.

SUMMARY OF THE INVENTION

The subject invention solves the problems outlined above. The subject invention is a livestock feed retention insert, which can be added to most conventional feeders to decrease livestock feed waste. The design of the subject invention, specifically the horizontally oriented shelf created by the mid-point bend of each vertical bar, allows the insert to fit snugly over a conventional round bale, yet be used with feeders of different diameters. The subject invention decreases the upper and lower hay access areas by preventing livestock from being able to insert their entire head into the feeding area. The subject invention provides a removable extension above the top horizontal member of the conventional feeder, which prevents livestock from pulling hay over the top of the feeder, yet still allows feeding from the upper portion of the insert. The subject invention can be moved and installed by one person.

The subject invention is comprised of a top and bottom horizontal frame member constructed of tubular material, preferably steel. The top and bottom members will generally be circular to accommodate the size and shape of a standard round bale. However, the subject invention could also be constructed to accommodate different shapes of feed bales and feeders. The bottom circular member will generally have the same or slightly larger circumference as a standard round bale. The preferred embodiment of the invention calls for the bottom portion of the insert to fit snugly around a standard round bale to prevent hay waste, yet allow livestock to access the hay.

The top and bottom horizontal frame members are connected with vertical tubular bars. The vertical bars are spaced far enough apart to allow livestock to access the hay being held by the insert for feeding. However, the vertical bars are spaced close enough together to prevent the feeding livestock from completely inserting their head into the interior of the insert, and pulling out large amounts of hay. The close spacing of the vertical bars also prevents excessive hay from being pulled from the round bale within the feeder.

The insert is installed by simply placing the insert over a standard round bale that is already within a conventional feeder, and securing the insert to the conventional feeder with chain or other securing means. The subject invention is designed to fit snugly over a conventional round bale, which further decreases hay waste. At approximately the mid-point of each of the vertical bars, an outward extending horizontal shelf is formed, which sits on the top horizontal framing member of the conventional feeder. The outward extending horizontal shelf is formed by two bends at the approximate mid-point of each vertical bar. The first bend, which is more proximal to the bottom circular horizontal frame member, is a 60 degree bend outward, which forms the horizontal portion of the shelf. The second bend, which is more proximal to the top circular horizontal frame member is a 75 degree bend upward, which orients the upper portion of the vertical bar back to extending upward. Each of the upward extending vertical bars connects to the upper circular horizontal frame member. This design allows the insert to be used with conventional feeders of varying diameters. Furthermore, this design allows fabrication to be based on the circumference of a standard round bale (or other size or shape of feed bale), not each individual conventional feeder the invention is to be utilized with. The upper vertical bars provide an extension above the conventional feeder, and to decrease the space the animal has to access hay from the conventional feeder.

The subject invention greatly decreases hay waste. The subject invention can be fabricated to fit most conventional livestock feeders, regardless of the shape of the conventional feeder. The prior art discloses conventional type feeders with a permanent upper portion with narrowly spaced bars, and various "feeder baskets." However, there does not appear to be embodiment in the prior art that addresses the problems set forth above. The subject invention solves the above problems.

The subject invention is a removable insert, which can be added to most conventional feeders to decrease hay waste. The subject invention decreases the upper and lower hay access areas by preventing livestock from being able to insert their entire head into the feeding area. The subject invention provides a removable extension above the top horizontal member of the conventional feeder, which prevents livestock from pulling hay over the top of the feeder. The shelf design allows the feeder to be used with conventional feeders of various diameters. Furthermore, the subject invention is easily moveable, and can be installed by one person. Therefore, the subject invention has utility in the livestock industry because the efficiency of a conventional feeder can be improved by adding the subject invention.

Furthermore, the subject invention's ability to accommodate varying diameters of conventional feeders, while retaining its hay saving characteristics allows the livestock owner to decrease hay waste, with only one insert. This is certainly a lower cost option than purchasing a new feeder with the hay saving characteristics described herein.

BRIEF DESCRIPTION OF THE PHOTOGRAPHS AND DRAWINGS

DETAILED DESCRIPTION OF THE PREFERRED EMBODIMENTS

Although only one embodiment is explained in detail, the figures and specifications should be understood as illustrations only, and are not intended to limit the invention in its scope. Also, in describing the embodiment specific terminology may be used, but it should be understood that specific terms include all technical equivalents that operate in similar manners to accomplish similar purposes.

Figure 1:
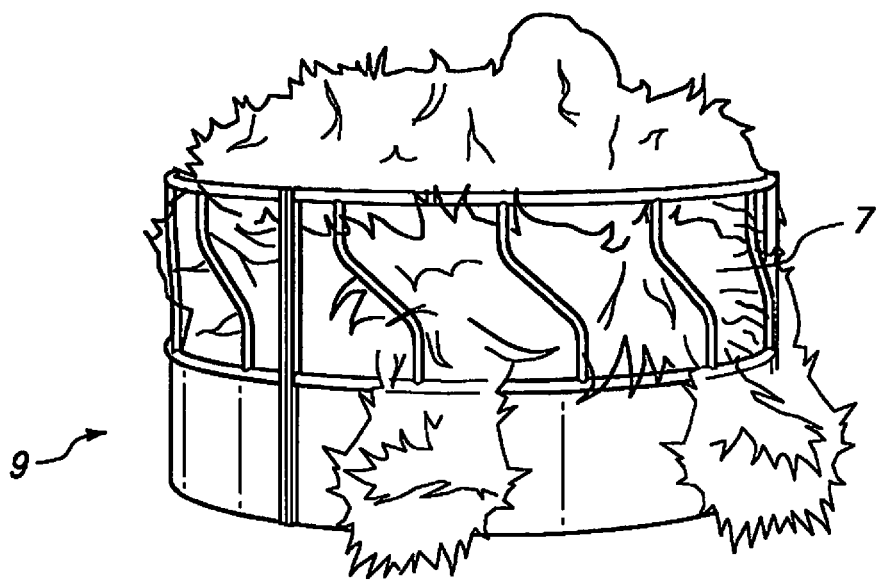
FIG. 1 is a side view of a conventional round bale feeder exhibiting hay waste due to excessive hay being pulled from the feeder.
Figure 2:
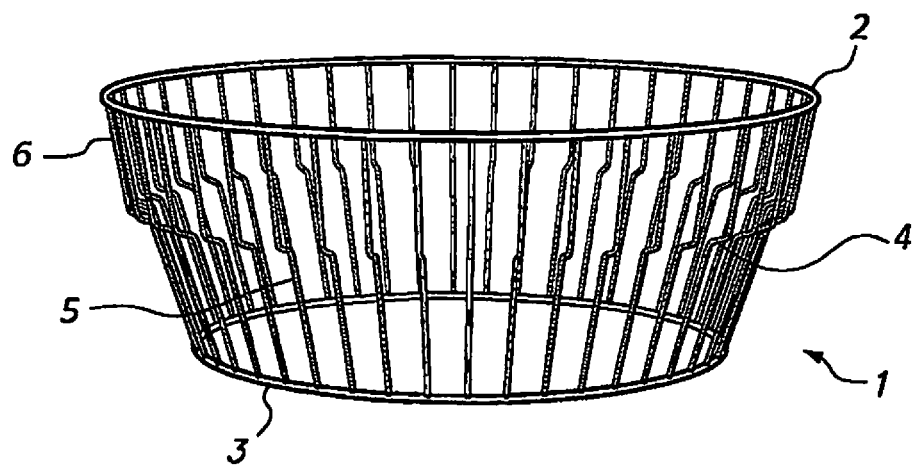
FIG. 2 is a perspective view of the Livestock Feed Retention Insert.
Figure 3:
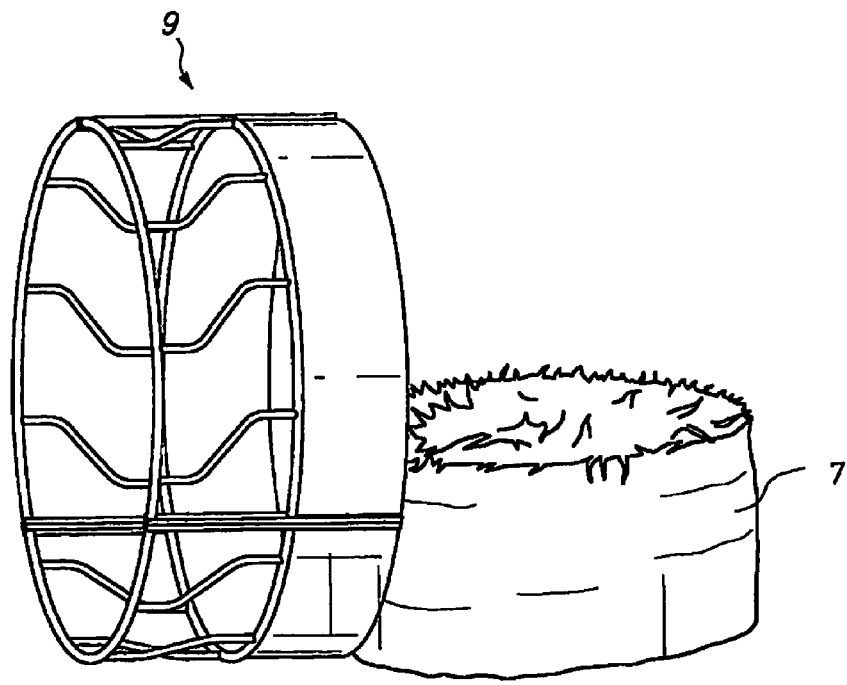
FIG. 3 is a perspective view of a conventional round bale feeder that has been rolled up to a pre-deposited round bale, prior to dropping over round bale.

With reference to the drawings, a preferred embodiment of the Livestock Feed Retention Insert 1 is illustrated in the attached drawings. The preferred embodiment is depicted in FIG. 2, and is comprised of a top 2 and bottom 3 horizontal frame member constructed of tubular material, preferably steel. The top 2 and bottom 3 members will generally be circular to accommodate the size and shape of a standard round bale 7 as shown in FIG. 3-6. However, the subject invention could also be constructed to accommodate different shapes of feed bales and feeders. The bottom circular member 3 will generally have the same or slightly larger circumference as a standard round bale 7 as depicted in FIG. 5-6. The preferred embodiment of the invention calls for the bottom portion of the insert 8 to fit snugly around a standard round bale 7 to prevent hay waste, yet allow livestock to access the hay as shown in FIG. 6.

The top 2 and bottom 3 horizontal frame members are connected with vertical tubular bars 5. The vertical bars 5 are spaced far enough apart to allow livestock to access the hay being held by the insert 1 for feeding. However, the vertical members 5 are spaced close enough together to prevent the feeding livestock from completely inserting their head into the interior of the insert 1. The close spacing of the vertical members 5 prevents excessive hay from being pulled from the round bale 7 within the conventional feeder 9 as depicted in FIG. 6.

At approximately the mid-point of each of the vertical bars 5, an outward extending horizontal shelf 4 is formed, which sits on the top horizontal framing member 10 of the conventional feeder 9. The outward extending horizontal shelf 4 is formed by two bends at the approximate mid-point of each vertical bar 5. The first bend, which is more proximal to the bottom circular horizontal frame member 3, is a 60 degree bend outward, which forms the horizontal portion of the shelf 4. The second bend, which is more proximal to the top circular horizontal frame member 2 is a 75 degree bend upward, which orients the upper portion of the vertical bar 6 back to extending upward until the vertical bar connects with the top circular horizontal frame member 2. The horizontal shelf 4 at the approximate mid-point of each vertical bar 5 will rest on the top 10 of the conventional feeder 9 as depicted in FIG. 6.

Figure 4:
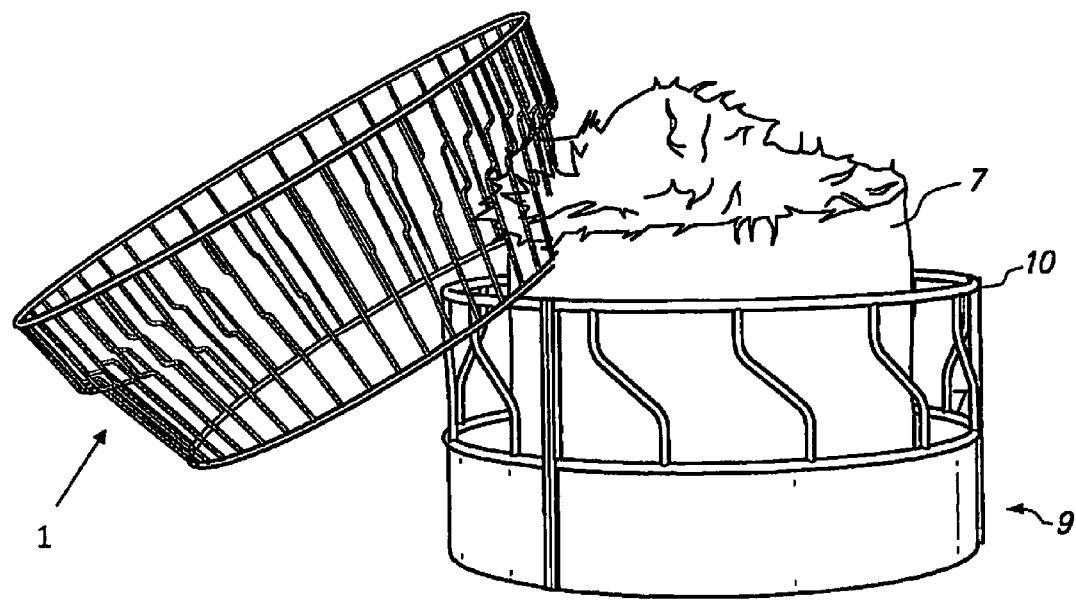
FIG. 4 is a perspective view of the Livestock Feed Retention Insert being installed over round bale, within conventional round bale feeder.
Figure 5:
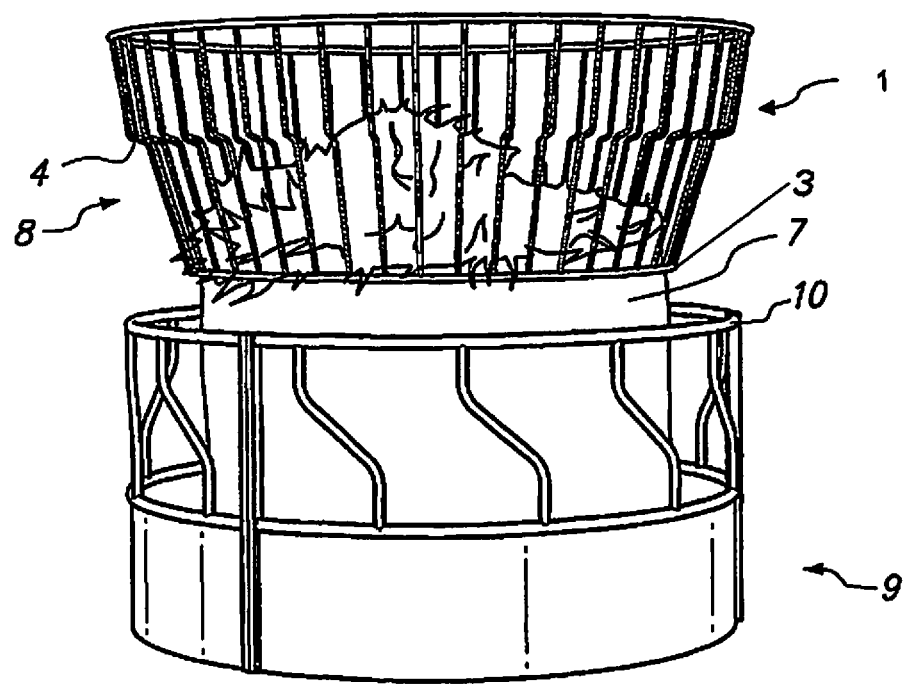
FIG. 5 is a perspective view of the Livestock Feed Retention Insert being installed over the round bale, bottom portion fining snugly around round bale.
Figure 6:
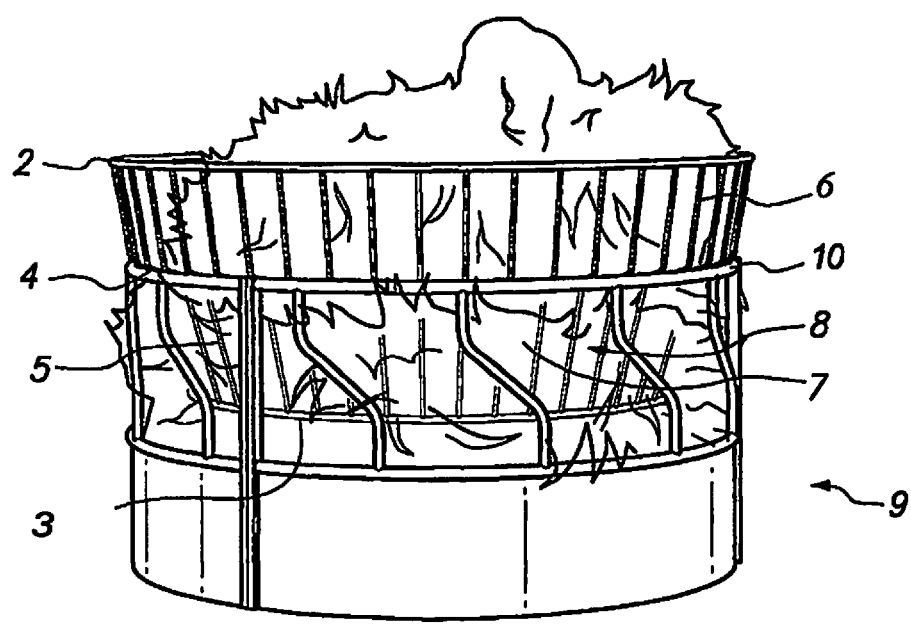
FIG. 6 is a side view of the fully installed Livestock Feed Retention Insert.

As shown in FIG. 4-6, the insert 1 is installed by simply placing the insert over a standard round bale 7 that is already within a conventional feeder 9. The insert 1 is then pushed down until the horizontal shelf 4 rests on the top horizontal member 10 of the conventional feeder 9 as shown in FIG. 6. The insert 1 is then secured to the top member 10 of the conventional feeder 9 with chain or other securing means. The insert 1 is designed to fit snugly over a conventional round bale 7 to retain hay. The upper portion of the vertical bars 6, provides an upper extension of the conventional feeder 9 to prevent feeding livestock from pulling hay over the top of the conventional feeder 9.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

I claim:

1. A livestock feed retention insert comprising:
   (a) a top horizontal frame member, a bottom horizontal frame member, and a plurality of vertical members which connect said top and bottom horizontal frame members;
   (b) said plurality of vertical members, are spaced close enough together to prevent feeding livestock from completely inserting their heads between said vertical members;
   (c) said bottom horizontal framing member and bottom portions of said vertical members fit snugly around the selected bale of livestock feed;
   (d) said plurality of vertical members include at the mid-point of each member, an outward extending horizontal portion formed by two bends of each vertical member, the first bend of each vertical member is located more proximal to said bottom horizontal frame member and is an outward bend, which forms the horizontally oriented portion of each vertical member, the second bend is located more proximal to said top horizontal frame member is an upward bend, which re-orients each vertical member to extend vertically;
   (e) said outward extending horizontal portion, which provides a horizontally oriented shelf to rest on top of a livestock feeder; and
   (f) said vertical members which form said horizontally oriented shelf are fastened to the top members of a livestock feeder.

2. The livestock feed retention insert of claim 1 where said top and bottom horizontal frame members, and said plurality of vertical members are constructed of tubular material.

3. The livestock feed retention insert of claim 1 where said bottom horizontal framing member is the circumference of a standard round bale.

4. The livestock feed retention insert of claim 3 where said first bend is a 60 degree bend outward, and said second bend is a 75 degree bend upward.

5. The livestock feed retention insert of claim 4 where said bottom horizontal framing member and bottom portions of said vertical members fit snugly around a standard round bale.

6. The livestock feed retention insert of claim 3 where said vertical members which form said horizontally oriented shelf are secured to the top members of a standard round bale livestock feeder by any securing means.

7. The livestock feed retention insert of claim 3 where said vertical members which form said horizontally oriented shelf are fastened to the top members of a standard round bale livestock feeder with standard chain and chain securing hardware.

8. A livestock feed retention insert comprising:
   (a) a top horizontal frame member, a bottom horizontal frame member, and a plurality of vertical members which connect said top and bottom horizontal frame members;
   (b) said plurality of vertical members, are spaced close enough together to prevent feeding livestock from completely inserting their heads between said vertical members;
   (c) said bottom horizontal framing member and bottom portions of said vertical members fit snugly around the selected bale of livestock feed;
   (d) said plurality of vertical members include at the mid-point of each member, an outward extending horizontal portion formed by two bends of each vertical member, the first bend of each vertical member is located more proximal to said bottom horizontal frame member and is an outward bend, which forms the horizontally oriented portion of each vertical member, the second bend is located more proximal to said top horizontal frame member is an upward bend, which re-orients each vertical member to extend vertically;
   (e) said outward extending horizontal portion, which provides a horizontally oriented shelf to rest on top of a livestock feeder;
   (f) said vertical members which form said horizontally oriented shelf are fastened to the top members of a livestock feeder;
   (g) said top and bottom horizontal frame members, and said plurality of vertical members are constructed of tubular steel;
   (h) where said bottom horizontal framing member is the circumference of a standard round bale;
   (i) where said first bend is a 60 degree bend outward, and said second bend is a 75 degree bend upward;
   (j) where said bottom horizontal framing member and bottom portions of said vertical members fit snugly around a standard round bale;

(k) where said vertical members which form said horizontally oriented shelf are secured to the top members of a standard round bale livestock feeder by any securing means.

9. The livestock feed retention insert of claim 8 where said vertical members which form said horizontally oriented shelf are secured to the top members of a standard round bale livestock feeder with standard chain and chain securing hardware.

* * * * *